US012707138B2

(12) United States Patent
Zhu et al.

(10) Patent No.: US 12,707,138 B2
(45) Date of Patent: Aug. 11, 2026

(54) ELECTRONIC DEVICE AND CONTROL METHOD THEREOF

(71) Applicant: Huawei Technologies Co., Ltd., Shenzhen (CN)

(72) Inventors: Shuaishuai Zhu, Dongguan (CN); Yiliang Zeng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 385 days.

(21) Appl. No.: 18/552,553

(22) PCT Filed: Mar. 22, 2022

(86) PCT No.: PCT/CN2022/082282
§ 371 (c)(1),
(2) Date: Sep. 26, 2023

(87) PCT Pub. No.: WO2022/199580
PCT Pub. Date: Sep. 29, 2022

(65) Prior Publication Data

US 2024/0171846 A1 May 23, 2024

(30) Foreign Application Priority Data

Mar. 26, 2021 (CN) ......................... 202110328563.3

(51) Int. Cl.
*H04N 23/611* (2023.01)
*G02B 5/30* (2006.01)
(Continued)

(52) U.S. Cl.
CPC ......... *H04N 23/611* (2023.01); *G02B 5/3025* (2013.01); *G02B 27/0093* (2013.01);
(Continued)

(58) Field of Classification Search
CPC .... H04N 23/611; H04N 23/11; G02B 5/3025; G02B 27/0093; G02B 27/0172;
(Continued)

(56) References Cited

U.S. PATENT DOCUMENTS 10,474,229 B1 11/2019 Gollier et al.
11,372,239 B1 * 6/2022 Sulai .................... G02B 27/283
2017/0147859 A1 * 5/2017 Zhang ....................... G06T 7/70

FOREIGN PATENT DOCUMENTS

CN 102706846 A * 10/2012
EP 3514606 A1 7/2019

* cited by examiner

*Primary Examiner* — Collin X Beatty
(74) *Attorney, Agent, or Firm* — Conley Rose, P.C.

(57) ABSTRACT

An electronic device includes a light source, a lens group, a display screen, and a camera module. The light source emits a first light ray to an eyeball of a user, the first light ray is reflected by the eyeball and enters the camera module through the lens group, and a second light ray emitted by the display screen is partly reflected or transmitted into the camera module through the lens group. A control method includes controlling the display screen to display based on a display periodicity which includes display time periods and black insertion time periods that are alternately arranged; and controlling the camera module to perform exposure in the black insertion time period to obtain the first light ray, and to stop exposure in the display time period; and forming an eyeball image based on the first light ray.

20 Claims, 10 Drawing Sheets

(51) Int. Cl.

| | |
|---|---|
| ***G02B 27/00*** | (2006.01) |
| ***G02B 27/01*** | (2006.01) |
| ***H04N 23/11*** | (2023.01) |

(52) U.S. Cl.
CPC ......... *G02B 27/0172* (2013.01); *H04N 23/11* (2023.01); *G02B 2027/0138* (2013.01)

(58) Field of Classification Search
CPC .......... G02B 2027/0138; G02B 27/017; G02B 27/0101; G06V 40/19
See application file for complete search history.

A frame rate is 90 fps, and one frame is 11.1 ms

Vsync signal

A display screen is turned on

Black insertion ~ 80% (8.9 ms)

The display screen is turned off

ELECTRONIC DEVICE AND CONTROL METHOD THEREOF

CROSS-REFERENCE TO RELATED APPLICATIONS

This is a National Stage of International Patent Application No. PCT/CN2022/082282 filed Mar. 22, 2022, which claims priority to Chinese Patent Application No. 202110328563.3 filed Mar. 26, 2021. Both of the aforementioned applications are hereby incorporated by reference in their entireties.

TECHNICAL FIELD

This application relates to the field of electronic device technologies, and in particular, to an electronic device and a control method thereof.

BACKGROUND

When using an electronic device such as a head-mounted display device, a user needs to perform eye movement calibration each time before using the head-mounted display device, to obtain a visual axis of an eyeball through calibration. However, eye movement calibration takes long time, and the user cannot use the device within the calibration time, resulting in poor user experience.

SUMMARY

Embodiments of this application provide a control method for an electronic device and the electronic device. The control method can effectively improve user experience.

According to a first aspect, a control method for an electronic device is provided. The electronic device includes a light source, a lens group, a display screen, and a camera module. The light source is configured to emit a first light ray to an eyeball of a user, the first light ray is reflected by the eyeball and enters the camera module through the lens group, and a second light ray emitted by the display screen is partly reflected or transmitted into the camera module through the lens group. The control method includes:

controlling the display screen to display based on a display periodicity, where the display periodicity includes display time periods and black insertion time periods that are alternately arranged;

controlling the camera module to perform exposure in the black insertion time period to obtain the first light ray, and to stop exposure in the display time period; and forming an eyeball image based on the first light ray.

It may be understood that the light source, the lens group, and the camera module in this application form an identity recognition apparatus, to perform identity recognition on the user. Eyeball image information of the user can be registered when the user uses the electronic device for the first time, and an eye movement calibration parameter of the user is stored in a personal file. When the user uses the electronic device again, a system directly invokes the eye movement calibration parameter of the user after confirming an identity of the user through sclera recognition, and the user may not need to perform eye movement calibration again. This saves time of the user and greatly improves user experience. In addition, in this application, the camera module is controlled to perform exposure when the display screen is in the black insertion time period, and to stop exposure when the display screen is in the display time period. Therefore, in an identity recognition process, the second light ray of the display screen is not sensed by the camera module, which prevents stray light from the display screen from entering the camera module, and effectively improves precision of the identity recognition.

In a possible implementation, before the controlling the camera module to perform exposure, the control method further includes lighting a light source, so that the camera module can receive the first light ray during the exposure.

In a possible implementation, the lighting a light source includes lighting a light source in a lighting time period, where the lighting time period covers at least one display time period and at least one black insertion time period, or the lighting time period covers at least one black insertion time period. In other words, the light source may be in a steady-on state, or may be displayed only in the black insertion time period, to be specific, the light source is lit when the camera module performs exposure, and is shut down when the camera module does not perform exposure, which can effectively save energy.

In a possible implementation, the light source is a visible light source, and the eyeball image is used for sclera recognition. Because a contrast of an eyeprint of an eyeball is high under lighting of visible light, using the lighting of visible light in sclera recognition can improve the precision of the identity recognition.

In a possible implementation, the light source includes a visible light source and a near-infrared light source, and the camera module is a near-infrared light and visible light dual-pass camera module; and the control method further includes:

controlling, in response to a user recognition instruction, the visible light source to emit the first light ray, where the camera module performs exposure to obtain a first eyeball image, and the first eyeball image is used for sclera recognition; and controlling, in response to an eye movement tracking instruction, the near-infrared light source to emit the first light ray, where the camera module performs exposure to obtain a second eyeball image, and the second eyeball image is used for eye movement tracking.

According to the control method in this application, the camera module may be the near-infrared light and visible light dual-pass camera module, and the eye movement tracking and user recognition may use the same camera module, which effectively saves costs and space of the electronic device.

In a possible implementation, the control method further includes: comparing the first eyeball image with a pre-stored image, and if the two match, invoking pre-stored eye movement calibration data, where the pre-stored eye movement calibration data corresponds to the pre-stored image.

According to the control method provided in this application, the identity recognition is performed on the user, sclera information of the user can be registered when the user uses the electronic device for the first time, and the eye movement calibration parameter of the user is stored in the personal file. When the user uses the electronic device again, the system directly invokes the eye movement calibration parameter of the user after confirming the identity of the user through the sclera recognition, and the user may not need to perform eye movement calibration again. This saves time of the user and greatly improves user experience. Certainly, the identity recognition may be further used in a scenario in which the electronic device is used, for example, sclera recognition payment is used for replacing password payment.

In a possible implementation, when the control method is applied to an electronic device that is turned on and that displays a startup interface, the control method further includes: comparing the first eyeball image with a pre-stored image; and if the two match, unlocking the electronic device, to enable the electronic device to enter a home interface. The control method in this application may also be the same as unlocking of the electronic device, and an unlocking speed through the sclera recognition is high, which improves user experience.

In a possible implementation, the control method further includes: if the first eyeball image does not match the pre-stored image, calibrating eye movement of the user to obtain eye movement calibration data, and storing the eye movement calibration data in an eye movement calibration database for next use.

According to a second aspect, an electronic device is provided. The electronic device includes a light source, a lens group, a camera module, a display screen, and a controller. The display screen is disposed on a light-emitting side of the lens group, the light source is disposed on a side that is of the lens group and that is away from the display screen, and a light-incident side of the camera module faces the lens group. A display periodicity of the display screen includes display time periods and black insertion time periods that are alternately arranged. The light source is configured to emit a first light ray to an eyeball of a user, the first light ray is reflected by the eyeball and enters the camera module through the lens group, and a second light ray emitted by the display screen is partly reflected or transmitted into the camera module through the lens group. The light source, the camera module, and the display screen are all electrically connected to the controller, the controller is configured to control the camera module to perform exposure in the black insertion time period to obtain the first light ray, and to stop exposure in the display time period, and an eyeball image is formed based on the first light ray.

It may be understood that the electronic device has an identity recognition function. In this application, the controller controls the camera module to perform exposure in the black insertion time period, and to stop exposure when the display screen is in the display time period. Therefore, in an identity recognition process, the second light ray of the display screen is not sensed by the camera module, which effectively prevents stray light from the display screen from entering the camera module, to obtain a clearer eyeball image, and effectively improves precision of identity recognition.

In a possible implementation, the light source is a visible light source. Because a contrast of an eyeprint of an eyeball is high under lighting of visible light, using the lighting of visible light in sclera recognition can improve the precision of the identity recognition.

In a possible implementation, the light source includes a visible light source and a near-infrared light source, and the camera module is a near-infrared light and visible light dual-pass camera module. Therefore, eye movement tracking and user recognition may use the same camera module, which effectively saves costs and space of the electronic device.

In a possible implementation, the lens group includes a lens and a partial-reflection partial-transmission film, and the partial-reflection partial-transmission film is disposed on a light-emitting side of the lens. A half of the second light ray from the display screen is reflected by the partial-reflection partial-transmission film, and the other half of the second light ray from the display screen passes through the partial-reflection partial-transmission film and is folded in the lens group. An optical path of the second light ray is increased, but a thickness of the electronic device is not increased, which facilitates miniaturization of the electronic device.

In a possible implementation, a transmittance of the partial-reflection partial-transmission film in a first band is greater than 95%, and a reflectivity is less than 1%, where the first band is a frequency band in which near-infrared light is located. The first light ray is the near-infrared light. In this solution, light rays that are reflected by the partial-reflection partial-transmission film and that finally enter the camera module can be effectively reduced, to reduce formed ghost images, and intensity loss of the first light ray can be reduced, so that intensity of the first light ray finally received by the camera module is strong enough, and the camera module can recognize a clear first light ray. This is beneficial for an eye movement tracking apparatus to perform an algorithm technology, improves the precision of the eye movement tracking, and further improves user experience.

In a possible implementation, the lens group further includes a reflective polarizer and a first wave plate, the first wave plate is disposed on a side that is of the lens and that faces away from the partial-reflection partial-transmission film, and the reflective polarizer is disposed on a side that is of the first wave plate and that faces away from the lens. The camera module further includes a first linear polarizer and a second wave plate, the first linear polarizer is located between the second wave plate and a camera lens of the camera module, a polarization direction of the reflective polarizer is the same as or perpendicular to a polarization direction of the first linear polarizer, and both the first wave plate and the second wave plate are quarter wave-plates. The reflective polarizer, the first wave plate, and the partial-reflection partial-transmission film may be understood as a multi-layer film structure in a pancake lens group, and an objective is to fold a light ray between film layers. The camera module includes the first linear polarizer and the second wave plate, which can effectively eliminate a light ray emitted after being folded by the lens group, and greatly reduce brightness of the ghost image.

In a possible implementation, the lens group further includes a reflective polarizer and a first wave plate, the first wave plate is disposed on a side that is of the lens and that faces away from the partial-reflection partial-transmission film, and the reflective polarizer is disposed on a side that is of the first wave plate and that faces away from the lens. The camera module further includes a first circular polarizer, rotation directions of the first circular polarizer and the first wave plate are the same, and polarization directions of the first circular polarizer and the reflective polarizer are the same or perpendicular to each other. The reflective polarizer, the first wave plate, and the partial-reflection partial-transmission film may be understood as a multi-layer film structure in a pancake lens group, and an objective is to fold a light ray between film layers. The camera module includes the first circular polarizer, which can effectively eliminate the light ray emitted after being folded by the lens group, and greatly reduce the brightness of the ghost image.

In a possible implementation, the electronic device further includes a second linear polarizer and a third wave plate, the second linear polarizer is disposed on a light-emitting side of the display screen, and the third wave plate is disposed between the second linear polarizer and the lens group. In this application, the second linear polarizer and the third wave plate are disposed between the display screen and the lens group. This can intercept a part that is of the second light ray emitted from the display screen and that returns to the display screen after being reflected by the lens group, and reduce a ghosting phenomenon in the electronic device due to a reflected light ray, and therefore, the user can view a clearer picture.

BRIEF DESCRIPTION OF DRAWINGS

To describe the technical solutions in embodiments of this application or in the background more clearly, the following describes the accompanying drawings used for describing embodiments of this application or the background.

DESCRIPTION OF EMBODIMENTS

The following describes embodiments of this application with reference to the accompanying drawings in embodiments of this application.

In the descriptions of embodiments of this application, it should be noted that, unless otherwise specified and limited, terms "mount" and "connection" should be understood in a broad sense. For example, the "connection" may be a detachable connection, or may be a non-detachable connection; and the "connection" may be a direct connection, or may be an indirect connection using an intermediate medium. "Fixed connection" means a connection to each other with a changeless relative position relationship after the connection. "Rotating connection" means a connection to each other with a capability of relative rotation after the connection. Orientation terms, for example, "left", "right", "inside", and "outside" mentioned in embodiments of this application are merely directions shown with reference to the accompanying drawings. Therefore, the orientation terms are used for better and more clearly describing and understanding embodiments of this application, but do not indicate or imply that a specified apparatus or element needs to have a particular orientation and be constructed and operated based on the particular orientation, and therefore, cannot be understood as a limitation on embodiments of this application. "A plurality of" means at least two.

It may be understood that the specific embodiments described herein are merely used for explaining a related invention, but do not limit the present invention. In addition, it should be further noted that, for ease of description, only a part related to the present invention is shown in the accompanying drawings.

It should be noted that, in a case that no conflict occurs, embodiments in this application and features in embodiments may be mutually combined.

Figure 1:
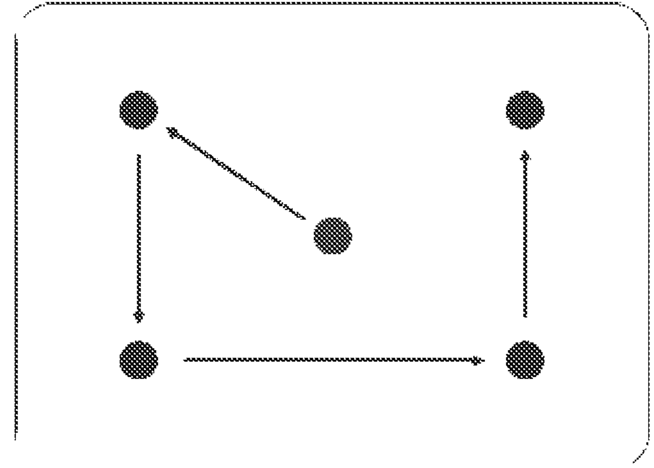
FIG. 1 is a schematic diagram of calibration of a head-mounted display device in a related technology.

FIG. 1 is a schematic diagram of calibration of a head-mounted display device in a related technology.

The head-mounted display device in the related technology can perform eye movement tracking for a user, and eye movement calibration needs to be performed for the user before the head-mounted display device is used. Generally, in a calibration process, 5 to 9 points are displayed on a display screen in sequence, and the user is prompted to view these points in sequence. Specifically, as shown in FIG. 1, 5 points are displayed on the display screen, and different colors are used for identifying the points guiding the user to view. For example, a point in the middle of FIG. 1 turns red, and then a next point is sequentially changed to red along an arrow, to prompt the user to view. It takes about 2 seconds for each point to turn red. The entire eye movement calibration takes about 20 to 40 seconds with an instruction tutorial before the calibration. Because the user needs to perform eye movement calibration each time before wearing an electronic device, the user cannot use the electronic device within half a minute after wearing the electronic device, resulting in poor user experience.

An embodiment of this application provides an electronic device, configured to be worn on a head of a user. The electronic device may be a head-mounted display device. For example, the electronic device may be an electronic product such as augmented reality (augmented reality. AR) glasses, an AR helmet, mixed reality (mixed reality, MR) glasses, or an MR helmet that combines digital content and real scenes. The electronic device may alternatively not be worn on the head. The electronic device in this application resolves a problem of poor user experience of an electronic device in the related technology. In this application, an example in which the electronic device is AR glasses is used for specific descriptions.

Figure 2:
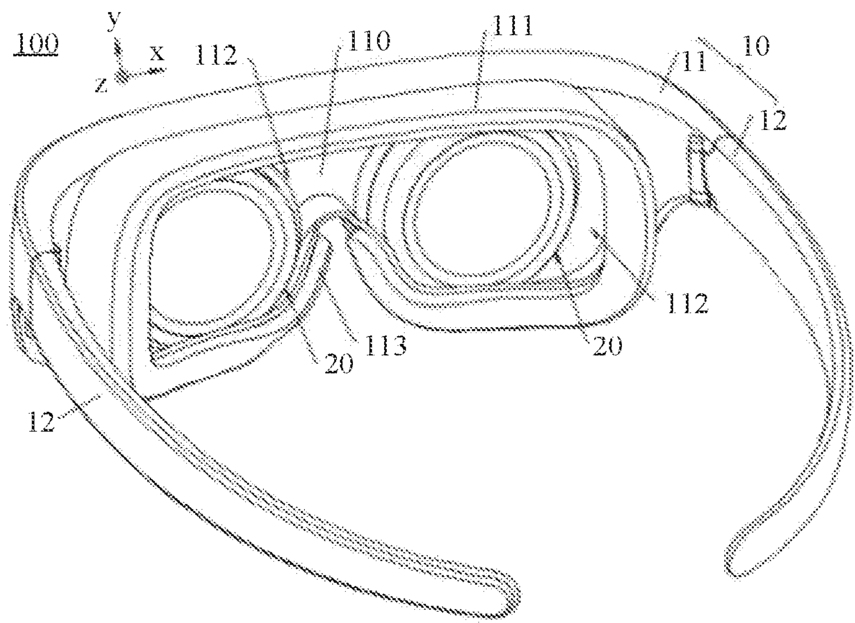
FIG. 2 is a schematic diagram of a structure of an electronic device according to an embodiment of this application.

FIG. 2 is a schematic diagram of a structure of an electronic device according to an embodiment of this application.

In this embodiment, an electronic device 100 includes a glass frame 10 and augmented reality components 20 mounted on the glass frame 10. There are two augmented reality components 20, and the two augmented reality components 20 are mounted on the glass frame 10 at an interval.

The glass frame 10 includes a glass body 11 and frame temples 12 connected to the glass body 11. There are two frame temples 12, and the two frame temples 12 are connected to two opposite ends of the glass body 11. It should be noted that, in another embodiment, the glass frame 10 may alternatively include a glass body 11 and a fastening band connected to the glass body 11. This is not specifically limited in this application.

The glass body 11 may include a mounting surface 110 and an eye mask 111. The eye mask 111 is disposed on the mounting surface 110 and forms accommodating cavities 112 with the mounting surface 110. In this embodiment, there are two accommodating cavities 112, and the two accommodating cavities 112 are separately configured to accommodate an electronic component of the electronic device 100. For example, a nose pad is formed at a position that is of the eye mask 111 and that is between the two accommodating cavities 112, to facilitate wearing. The glass body 11 may be an integrated structure, to ensure overall strength of the glass body 11. A material of the glass body 11 includes but is not limited to metal, plastic, resin, a natural material, or the like. It should be understood that, the glass body 11 is not limited to the structure shown in FIG. 2, and may alternatively be a half-frame or frameless glasses frame, provided that the electronic component of the electronic device 100 can be accommodated.

The two frame temples 12 are rotatably connected to the two opposite ends of the glass body 11. When the electronic device 100 is in an unfolded state (as shown in FIG. 2), the two frame temples 12 rotate relative to the glass body 11, to face each other. In this case, the two frame temples 12 of the electronic device 100 may be respectively mounted on two ears of a user, and the nose pad is mounted on a nose bridge of the user, so that the electronic device is worn on a head of the user. During wearing, two eyeballs of the user are respectively opposite to the accommodating cavities 112 corresponding to the two eyeballs, to view a picture presented by the electronic component located in the accommodating cavities 112. When the electronic device 100 is in a folded state, the two frame temples 12 rotate relative to the glass body 11 until the two frame temples overlap each other at least partially and are accommodated in an inner side of the glass body 11. In this case, the electronic device 100 can be accommodated.

For example, the eye mask 111 may have specific flexibility. When the user wears the electronic device 100, the eye mask 111 contacts skin of the user, to prevent external light from passing through a gap between the skin of the user and the eye mask 111, which affects viewing experience of the user. In addition, the eye mask 111 is flexible, so that gravity of the electronic device 100 can be cushioned, which brings good wearing experience to the user. Certainly, in another embodiment, only a part of the eye mask 111 that contacts the user is flexible. Alternatively, the eye mask 111 may not be flexible.

It may be understood that, in another embodiment, the two frame temples 12 may respectively be fastened to two opposite ends of the glass body 11. Alternatively, the two frame temples 12 may be integrated with the glass body 11, that is, the electronic device 100 is always in the unfolded state. This is not specifically limited in this application. It should be noted that, an accommodation cavity may also be disposed inside the frame temple 12, and the accommodation cavity of the frame temple 12 may also accommodate the electronic component of the electronic device 100.

It should be noted that, when the electronic device 100 is mentioned in this application, orientation terms such as "inner side" and "outer side" are mainly described based on an orientation of the electronic device 100 when the electronic device is worn on the head of the user. When the electronic device 100 is worn by the user, a side close to the head of the user is used as the inner side, and a side far away from the head of the user is used as the outer side. This does not limit the orientation of the electronic device 100 in another scenario.

Subsequently, for ease of description, as shown in FIG. 2, a length direction of the electronic device 100 is defined as an x-axis direction, a width direction of the electronic device 100 is defined as a y-axis direction, and a thickness direction of the electronic device 100 is defined as a z-axis direction. The x-axis direction, the y-axis direction, and the z-axis direction are perpendicular to each other. The x-axis direction is a direction from one accommodating cavity 112 to another accommodating cavity 112 in the accommodating cavities 112, and the z-axis direction is a direction from the glass body 11 to the frame temple 12.

In this embodiment, structures of the two augmented reality components 20 are the same. Specifically, the two augmented reality components 20 are respectively mounted in the accommodating cavities 112 that are of the glass body 11 and that correspond to the two augmented reality components 20. In other words, the two augmented reality components 20 are disposed side by side along the x-axis direction. When the electronic device 100 is worn on the head of the user, one augmented reality component 20 corresponds to a left eye of the user, and the other augmented reality component 20 corresponds to a right eye of the user. In this case, two eyes of the user may view a virtual scene and a real scene through the two augmented reality components 20. It should be noted that, in another embodiment, the structures of the two augmented reality components 20 may alternatively be different. This is not specifically limited in this application.

Figure 3:
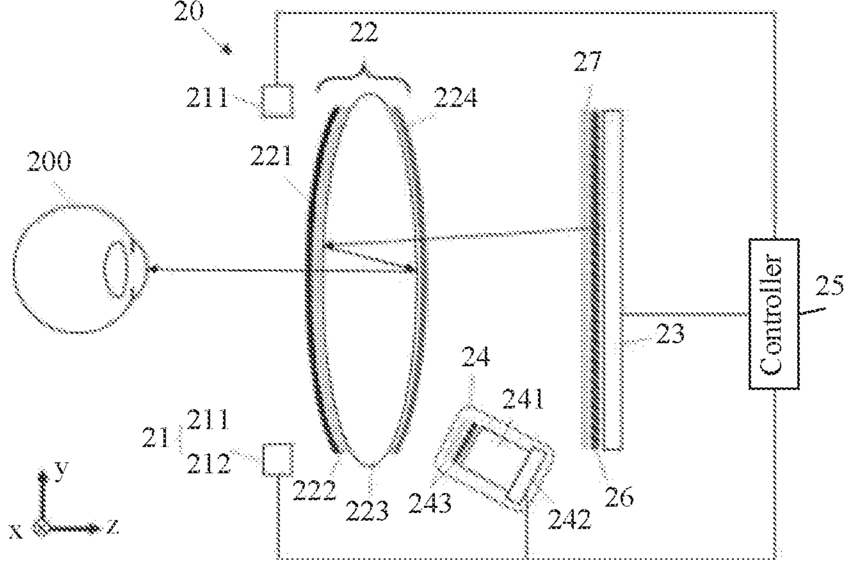
FIG. 3 is a schematic diagram of a structure of an augmented reality component of a structure shown in FIG. 2.

Subsequently, for ease of understanding, an example in which the augmented reality component 20 corresponds to the right eye of the user is used for specifically describing the structure of the augmented reality component 20. FIG. 3 is a schematic diagram of an augmented reality component 20 of a structure shown in FIG. 2.

The augmented reality component 20 includes a light source 21, a lens group 22, a display screen 23, a camera module 24, and a controller 25. The camera module 24 is located between the lens group 22 and the display screen 23, a light-incident side of the camera module 24 faces the lens group 22, and the light source 21 is disposed on a side that is of the lens group 22 and that is away from the camera module 24. The light source 21 is configured to emit a first light ray to an eyeball of a user, the first light ray is reflected by the eyeball and enters the camera module 24 through the lens group 22, and a second light ray emitted by the display screen 23 is partly reflected into the camera module 24 through the lens group 22. The light source 21, the camera module 24, and the display screen 23 are all electrically connected to the controller 25, and the controller 25 is configured to control the light source 21 and the camera module 24 based on a display periodicity of the display screen 23.

It may be understood that each of two augmented reality components 20 has one display screen 23, or two augmented reality components 20 share one display screen 23.

Figure 4:
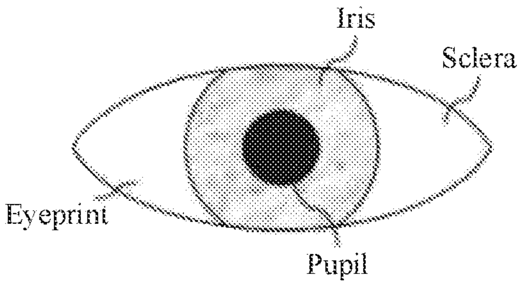
FIG. 4 is a schematic diagram of an eyeball.

The light source 21, the lens group 22, the camera module 24, and the controller 25 form an eye movement tracking apparatus or an identity recognition apparatus, and the display screen 23 and the lens group 22 form a display apparatus. The eye movement tracking apparatus/identity recognition apparatus and the display apparatus share the lens group 22. Because the augmented reality component 20 faces the eyeball of the user, identity recognition may be performed for the user through sclera recognition. The sclera recognition is also referred to as eyeprint recognition, and performs identity recognition through distribution of capillaries in a scleral area of the eyeball of the user. FIG. 4 is a schematic diagram of an eyeball, where a gray curved short line is a capillary in a sclera area, and the capillary is also referred to as an eyeprint.

It may be understood that an augmented reality component 20 in this embodiment can be configured to simulate a virtual environment through a display apparatus. For example, a stereoscopic image may be displayed on a display screen 23 to simulate illusion of depth, that is, to create a virtual environment, in which a user is under illusion of being in the virtual environment. The augmented reality component 20 can further estimate, through an eye movement tracking apparatus, which part of the virtual environment is being viewed by the user. In other words, when the display apparatus of the augmented reality component 20 is capable of presenting the virtual environment to the user, the eye movement tracking apparatus can detect a position at which the user gazes, that is, a specific position of the virtual environment at which the user gazes, and better adjust the virtual environment presented to the user based on the position at which the user gazes, to improve user experience. The augmented reality component 20 may further perform identity recognition for the user through an identity recognition apparatus, to reduce related calibration steps and improve user experience.

Specifically, a light source 21 includes a visible light source 211 and a near-infrared light source 212. The visible light source 211, a lens group 22, a camera module 24, and a controller 25 form the identity recognition apparatus. The near-infrared light source 212, the lens group 22, the camera module 24, and the controller 25 form an eye movement tracking apparatus. Because both eye movement tracking and sclera recognition need an eyeball image of the user, the eye movement tracking and the sclera recognition may share one camera module 24, which effectively reduces costs and space of an electronic device 100.

When the electronic device 100 needs to perform eye movement tracking for the user, the controller 25 controls the near-infrared light source 212 to be lit. A first light ray is near-infrared light, and is sensed by the camera module 24 to form the eyeball image. Because the eye movement tracking may be accompanied by an experience process of most electronic devices 100, the user cannot perceive that the near-infrared light source 212 is used during the eye movement tracking, which improves user experience. When the electronic device 100 needs to perform identity recognition for the user, the controller 25 controls the visible light source 211 to be lit. The first light ray is visible light, and is sensed by the camera module 24 to form the eyeball image. Because a contrast of an eyeprint of an eyeball is high under lighting of visible light, using the lighting of visible light in sclera recognition can improve precision of the identity recognition.

Certainly, in another embodiment, a light source of an eye movement tracking apparatus may alternatively be a visible light source, and a light source of an identity recognition apparatus may be a near-infrared light source. Alternatively, light sources of the eye movement tracking apparatus and the identity recognition apparatus are both visible light sources. Alternatively, light sources of the eye movement tracking apparatus and the identity recognition apparatus are both near-infrared light sources.

It may be understood that the visible light source 211 and the near-infrared light source 212 may be two separate light sources. The visible light source 211 and the near-infrared light source 212 may be disposed on a side that is of the lens group 22 and that faces away from the display screen 23, which facilitates emitting a light ray to the eyeball of the user, to perform eye movement tracking or identity recognition for the user. Specifically, the light source 21 may be fastened to a glass body 11 or a frame temple 12, or may be fastened to the glass body 11 or the frame temple 12 through an intermediate connecting piece (FIG. 2). There may be one or more visible light sources 211 and near-infrared light sources 212.

Certainly, in another embodiment, the visible light source and the near-infrared light source may be an integrated light source 21. In other words, the light source can emit both visible light and near-infrared light. A controller may control the light source to emit the visible light or the near-infrared light. Alternatively, the light source is only a visible light source.

In the embodiment shown in FIG. 3, the augmented reality component 20 shows only one visible light source 211 and one near-infrared light source 212. Certainly, in another embodiment, there may alternatively be a plurality of visible light sources 211 and near-infrared light sources 212. When there are a plurality of visible light sources 211 and near-infrared light sources 212, in comparison with a solution in which there is one visible light source 211 and one near-infrared light source 212, luminous intensity of a single light source 21 in the plurality of visible light sources 211 and near-infrared light sources 212 may be set to be weaker, so that a risk of damage to the eyeball of the user due to excessive light exposure can be reduced. The visible light source 211 and the near-infrared light source 212 may alternatively be disposed at another position of the augmented reality component 20. A quantity and a disposition position of the visible light sources 211 and the near-infrared light sources 212 are not limited in this application.

According to the electronic device 100 in this application, the identity recognition apparatus is added, sclera information of the user can be registered when the user uses the electronic device 100 for the first time, and an eye movement calibration parameter of the user is stored in a personal file. When the user uses the electronic device 100 again, a system directly invokes the eye movement calibration parameter of the user after confirming an identity of the user through sclera recognition, and the user may not need to perform eye movement calibration again. This saves time of the user and greatly improves user experience. Certainly, the identity recognition apparatus may be further used in a scenario in which the electronic device 100 is used, for example, sclera recognition payment is used for replacing password payment.

In this embodiment, the lens group 22 is a pancake (Pancake) lens group. The lens group 22 includes a reflective polarizer 221, a first wave plate 222, a lens 223, and a partial-reflection partial-transmission film (Beam Splitter, BS) 224. The first wave plate 222 is disposed on a light-incident side of the lens 223. It may be understood that the light-incident side of the lens 223 is a side where a light ray of the light source 21 enters the lens 223, and the reflective polarizer 221 is disposed on a side that is of the first wave plate 222 and that faces away from the lens 223. The partial-reflection partial-transmission film 224 is disposed on a light-emitting side of the lens 223, that is, a side that is of the lens 223 and that faces away from the first wave plate 222, and is located between the lens 223 and the display screen 23. In other words, on an optical axis of the lens 223, the reflective polarizer 221, the first wave plate 222, the lens 223, and the partial-reflection partial-transmission film 224 are sequentially disposed. For example, there is one lens 223. Certainly, there may alternatively be a plurality of lenses 223. A quantity of reflective polarizers 221, a quantity of first wave plates 222, and a quantity of partial-reflection partial-transmission films 224 may alternatively not be limited to one. The lens group 22 may be directly fastened to the glass body 11 of the glass frame 10 (FIG. 2), or may be indirectly fastened to the glass body 11 of the glass frame 10. In another embodiment, the lens group 22 may be another type of lens group 22 other than the pancake lens group.

In this embodiment, the first wave plate 222 is attached to a surface that is of the lens 223 and that is located on a light-incident side, the partial-reflection partial-transmission film 224 is attached to a surface that is of the lens 223 and that is located on the light-emitting side, and the reflective polarizer 221 is attached to a surface that is of the first wave plate 222 and that faces away from the lens 223. In other words, the reflective polarizer 221, the first wave plate 222, and the partial-reflection partial-transmission film 224 are all directly or indirectly attached and fastened to the lens 223, and the lens 223 is fastened to the glass body 11. This avoids using another bracket to fasten the reflective polarizer 221, the first wave plate 222, and the partial-reflection partial-transmission film 224, and facilitates miniaturization of the lens group 22. The reflective polarizer 221, the first wave plate 222, and the partial-reflection partial-transmission film 224 may be understood as a multi-layer film structure in the pancake lens group, and an objective is to fold a light ray between film layers. Certainly, in another embodiment, the first wave plate 222, the reflective polarizer 221, and the partial-reflection partial-transmission film 224 may alternatively be fastened to the glass body 11 through another fastening structure.

For example, the reflective polarizer 221 is a reflective polarizing film (Reflective Polarizer, RP), and the first wave plate 222 is a quarter wave-plate (Quarter Wave-plate, QWP). A function of the reflective polarizer is to transmit polarized light whose polarization direction is perpendicular to an x-axis direction, and reflect polarized light whose polarization direction is parallel to the x-axis direction, that is, the reflective polarizer 221 may reflect the polarized light in the x-axis direction, and transmit the polarized light in a y-axis direction. In other words, a polarization direction of the reflective polarizer 221 is along the y-axis direction. The quarter wave-plate is a birefringent single crystal wave plate having a specific thickness. A fast axis direction of the first wave plate 222 is 45 degrees to a y-axis.

In this embodiment, a transmittance of the partial-reflection partial-transmission film 224 in a first band is greater than 95%, a reflectivity is less than 1%, where the first band is a frequency band in which near-infrared light is located, in other words, the frequency band of the first band is 850 nm±20 nm. In other words, when the near-infrared light source 212 emits a light ray, to be specific, when a first light ray is near-infrared light and the first light ray passes through the partial-reflection partial-transmission film 224, most of the first light ray can be emitted from the partial-reflection partial-transmission film 224, and an extremely small part of the light ray is reflected. In this solution, light rays that are reflected by the partial-reflection partial-transmission film 224 and that finally enter a camera module 24 can be effectively reduced, to reduce formed ghost images, and intensity loss of the first light ray can be reduced, so that intensity of the first light ray finally received by the camera module 24 is strong enough, and the camera module 24 can recognize a clear first light ray. This is beneficial for an eye movement tracking apparatus to perform an algorithm technology, improves precision of eye movement tracking, and further improves user experience.

The partial-reflection partial-transmission film 224 is partially reflective and partially transmissive in a second band, to be specific, a transmittance of the partial-reflection partial-transmission film 224 in the second band is 50%, and a reflectivity is 50%. The second band is a band in which visible light (or a light ray emitted by the display screen 23) is located, in other words, a frequency band of the second band is 400 nm to 720 nm. A half of the first light ray from the visible light source 211 is transmitted through the partial-reflection partial-transmission film 224, and enters the camera module 24. A half of the second light ray from the display screen 23 is reflected by the partial-reflection partial-transmission film 224, and the other half of the second light ray from the display screen 23 passes through the partial-reflection partial-transmission film, and is folded in the lens group 22. An optical path of the second light ray is increased, but a thickness of the augmented reality component 20 is not increased, which facilitates miniaturization of the augmented reality component 20.

In this embodiment, the camera module 24 is a near-infrared light and visible light dual-pass camera module 24, to be specific, the camera module 24 can photograph both near-infrared light and visible light. The camera module 24 may include a camera lens 241, an image sensor 242 that senses the first light ray, and an optical component 243. The optical component 243 is disposed on a light-incident side of the camera lens 241. In this embodiment, the image sensor 242 is a photosensitive chip, and the camera module 24 is fastened to the glass body 11. The camera module 24 may be directly fastened to the glass body 11, or may be indirectly fastened to the glass body 11.

As shown in FIG. 3, the optical component 243 includes a first linear polarizer 2431 and a second wave plate 2432. The first linear polarizer 2431 is disposed on the light-incident side of the camera lens 241, and the second wave plate 2432 is disposed on a side that is of the first linear polarizer 2431 and that faces away from the camera lens 241. In other words, the first linear polarizer 2431 is located between the camera lens 241 and the second wave plate 2432. In this embodiment, the polarization direction of the reflective polarizer 221 is perpendicular to a polarization direction of the first linear polarizer 2431. The first linear polarizer 2431 is a polarizing film. The second wave plate 2432 is a quarter wave-plate. For example, the first linear polarizer 2431 may be bonded and fastened to a surface on which the light-incident side of the camera lens 241 is located, and the second wave plate 2432 may be bonded and fastened to a surface that is of the first linear polarizer 2431 and that faces away from the camera lens 241.

Certainly, in another implementation scenario, the first linear polarizer 2431 and the second wave plate 2432 may alternatively be fastened to the light-incident side of the camera lens 241 through a fastening ring. Alternatively, the first linear polarizer 2431 and the second wave plate 2432 may be screwed and fastened to the camera lens 241 through an intermediate piece. Alternatively, the first linear polarizer 2431 and the second wave plate 2432 may alternatively be fastened to the glass body 11 of the glass frame 10.

Certainly, in an implementation scenario of another embodiment, the polarization direction of the reflective polarizer 221 is the same as the polarization direction of the first linear polarizer 2431. In another implementation scenario of another embodiment, the optical component 243 includes a first circular polarizer, rotation directions of the first circular polarizer and the first wave plate 222 are the same, and polarization directions of the first circular polarizer and the reflective polarizer 221 are the same or perpendicular to each other. In other words, the first circular polarizer can replace the first linear polarizer 2431 and the second wave plate 2432.

Figure 5:
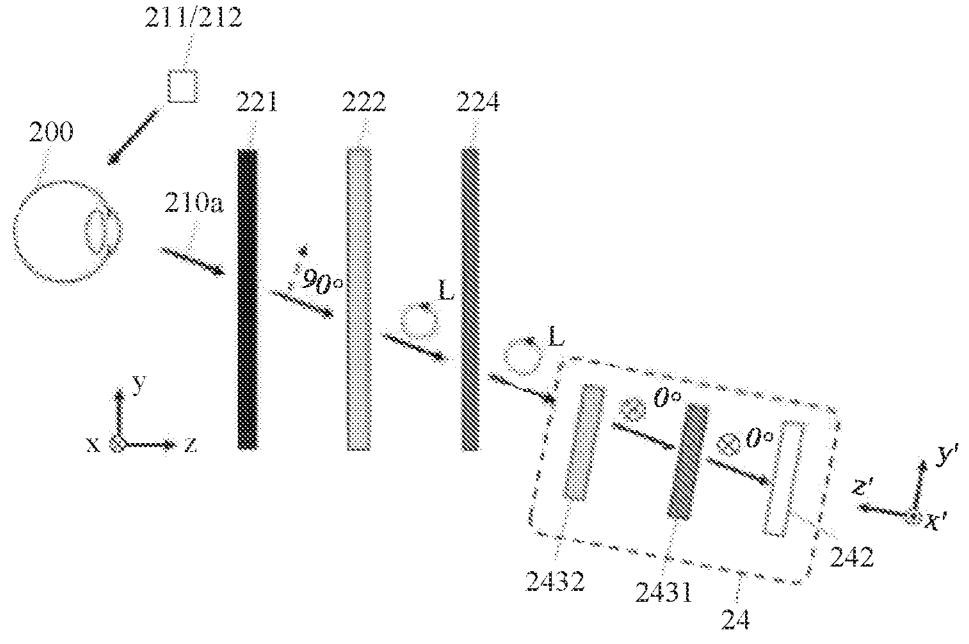
FIG. 5 is a schematic diagram of a propagation path of a first light ray of an augmented reality component shown in FIG. 3.

For ease of description, as shown in FIG. 5, an optical axis direction of the camera module 24 is defined as a z'-axis, a reverse direction of an x-axis is defined as an x'-axis, a direction perpendicular to the optical axis direction of the camera module 24 is defined as a y'-axis, and the x'-axis direction, the y'-axis direction, and the z'-axis direction are perpendicular to each other. An optical axis of the first linear polarizer 2431 is along the y'-axis direction, and an included angle between a fast axis direction of the second wave plate 2432 and the polarization direction of the first linear polarizer 2431 is 45 degrees, that is, the fast axis direction of the second wave plate 2432 is 45 degrees to the x'-axis.

To clearly describe a process in which the camera module 24 photographs an eyeball of a user, the process may be an eyeball image photographed during eye movement tracking, or may be an eyeball image photographed during identity recognition. FIG. 5 shows polarization states of a first light ray 210*a* reflected by an eyeball after the first light ray passes through different elements during travelling to an image sensor 242 of the camera module 24. The first light ray 210*a* may be visible light emitted by a visible light source 211, or may be near-infrared light emitted by a near-infrared light source 212.

A light ray emitted by a visible light source or a near-infrared light source is natural light, and the natural light includes polarized light that vibrates in various directions. The natural light is reflected by an eyeball 200 of a user to form the first light ray 210*a*, which is still natural light. After passing through a reflective polarizer 221, the first light ray 210*a* is modulated to be linearly polarized light whose polarization direction is perpendicular to the x-axis. A fast axis direction of a first wave plate 222 is 45 degrees to the x-axis, and after the first light ray passes through the first wave plate 222, a polarization state of the first light ray 210*a* is modulated to be left-handed polarized light. Because a partial-reflection partial-transmission film 224 does not change the polarization state of the first light ray 210*a*, the first light ray 210*a* is still the left-handed polarized light after passing through the partial-reflection partial-transmission film 224. After being modulated by the second wave plate 2432, the left-handed polarized light becomes linearly polarized light whose polarization direction is along the x'-axis direction. A light transmission axis of the first linear polarizer 2431 is along the x'-axis direction. Therefore, the linearly polarized light passes through the first linear polarizer 2431, and is focused on the image sensor 242 through a camera lens 2412 of the camera module 24. That is, the camera module 24 photographs a light ray reflected by the eyeball 200 of the user, to form an image.

The partial-reflection partial-transmission film 224 in this embodiment has high transmittance and low reflectivity in a first band (near infrared light 850 nm±20 nm). Therefore, when the first light ray 210*a* is near infrared light, the partial-reflection partial-transmission film 224 is equivalent to a parallel plate, and a case of stray light or ghost images caused by reflection on a surface of the partial-reflection partial-transmission film 224 is slight. The partial-reflection partial-transmission film 224 is partially reflective and partially transmissive in a second band (visible light 400 nm to 720 nm). When the first light ray 210*a* is visible light, a half of the first light ray 210*a* passes through the partial-reflection partial-transmission film 224 and enters the camera module 24.

Figure 6:
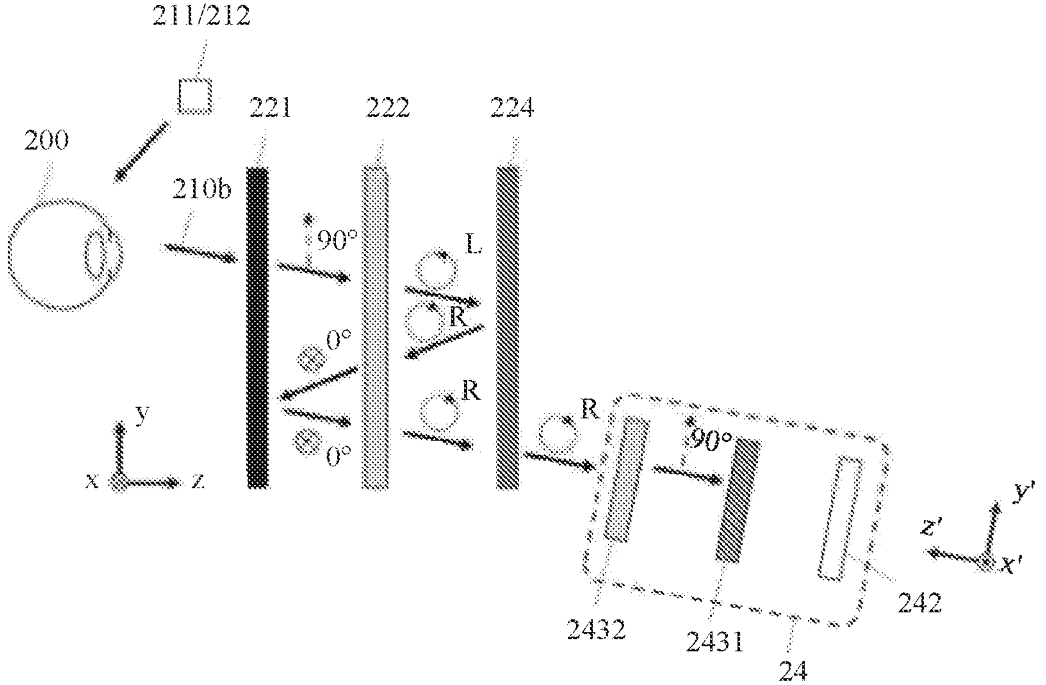
FIG. 6 is a schematic diagram of a propagation path of another light ray of an augmented reality component shown in FIG. 3.

In addition, as shown in FIG. 6, in an embodiment, a light ray emitted after being folded by a lens group 22 can be effectively eliminated, and brightness of a ghost image can be greatly reduced. In this embodiment, a light ray emitted by a visible light source or a near-infrared light source is natural light, and after the natural light is reflected by an eyeball 200 of a user, a light ray 210*b* is formed, which is still natural light. After passing through a reflective polarizer 221, the light ray 210*b* is modulated to be linearly polarized light whose polarization direction is perpendicular to an x-axis. A fast axis direction of a first wave plate 222 is 45 degrees to the x-axis, and after the light ray passes through the first wave plate 222, a polarization state of the light ray 210*b* is modulated to be left-handed polarized light. Because a partial-reflection partial-transmission film 224 does not change the polarization state of the light ray 210*b*, a part of the light ray 210*b* is reflected by the partial-reflection partial-transmission film 224 to form right-handed polarized light. Subsequently, the light ray 210*b* passes through a second wave plate 2432, and is modulated by the second wave plate 2432 to be linearly polarized light whose polarization direction is 90 degrees to the x'-axis direction. Because the polarization direction is perpendicular to a light transmission axis direction of a first linear polarizer 2431, the light ray 210*b* is absorbed by the first linear polarizer 2431. To be specific, a folded light ray 210*b* is absorbed by the first linear polarizer 2431, and does not hit an image sensor 242 of a camera module 24, and cannot be superimposed with an image formed by a first light ray 210*a*. This can effectively eliminate the ghost image, and improve precision of an eye movement tracking algorithm or identity recognition.

Certainly, in another embodiment, if a light transmission axis of the first linear polarizer 2431 is the same as alight transmission axis of the reflective polarizer 221, the first light ray 210*a* is blocked by the first linear polarizer 2431 and is not sensed by the camera module 24, and the light ray 210*b* passes through the first linear polarizer 2431 and is sensed by the camera module 24. In this way, the light ray 210*b* reflected by the eyeball is folded once between the reflective polarizer 221 and the partial-reflection partial-transmission film 224. Therefore, in comparison with a case in which the eyeball of the user is photographed directly through the lens group 22, the camera module 24 can photograph the eyeball of the user at a smaller tilt angle. This is beneficial for the camera module 24 to photograph the light ray 210*b*, reduces a difference and distortion of the camera module 24, and improves precision of eye movement tracking or identity recognition.

In this embodiment, a display screen 23 includes but is not limited to a fast liquid crystal display (Fast liquid crystal display, Fast LCD), a Micro-OLED, a liquid crystal on silicon (Liquid Crystal on Silicon, LCOS), a digital light processor (Digital Light Processor, DLP), a Micro-LED, and the like.

It may be understood that, to eliminate a smearing phenomenon of a picture when the user moves the head, black insertion processing is performed for the display screen 23, to be specific, the display screen 23 is in a turned-on state within time that is only about 20% of a display periodicity, and the time period is a display time period. The display screen 23 is in a turned-off state in other time, and the time period is a black insertion time period. A controller 25 is electrically connected to the display screen 23, to obtain whether the display screen 23 is in the black insertion time period or in the display time period. When an electronic device 100 needs to perform eyeball tracking for the user or needs to perform identity recognition for the user, the controller 25 may control the visible light source 211 or the near-infrared light source 212 to be lit. When the display screen 23 is in the black insertion time period, the controller 25 controls the camera module 24 to perform exposure, to obtain a first light ray. When the display screen 23 is in the display time period, the controller 25 controls the camera module 24 to stop exposure, to form an eyeball image based on the first light ray.

Because the camera module 24 performs exposure when the display screen 23 is in the black insertion time period, and stops exposure when the display screen 23 is in the display time period, the first light ray is sensed by the camera module 24, and a second light ray is not sensed by the camera module 24. This effectively prevents stray light from the display screen 23 from entering the camera module 24, to obtain a clearer eyeball image, and improves the precision of the eye movement tracking or the identity recognition.

As shown in FIG. 3, the augmented reality component 20 further includes a second linear polarizer 26 and a third wave plate 27. The second linear polarizer 26 is disposed on a light-emitting side of the display screen 23, and the third wave plate 27 is disposed between the second linear polarizer 26 and the partial-reflection partial-transmission film 224. In this embodiment, the second linear polarizer 26 is a polarizing film, and the third wave plate 27 is a quarter wave-plate. The second linear polarizer 26 may be bonded and fastened to a display surface of the display screen 23, and the third wave plate 27 may be bonded and fastened to a surface that is of the second linear polarizer 26 and that faces away from the display screen 23.

Certainly, in another embodiment, the second linear polarizer 26 and the third wave plate 27 may be sequentially fastened, through an intermediate piece, to a side that the display surface of the display screen 23 faces. Alternatively, the augmented reality component 20 further includes a second circular polarizer, and the second circular polarizer is disposed between the partial-reflection partial-transmission film 224 and the display screen 23. In other words, the second circular polarizer may replace the second linear polarizer 26 and the third wave plate 27.

Figures 7, 8:
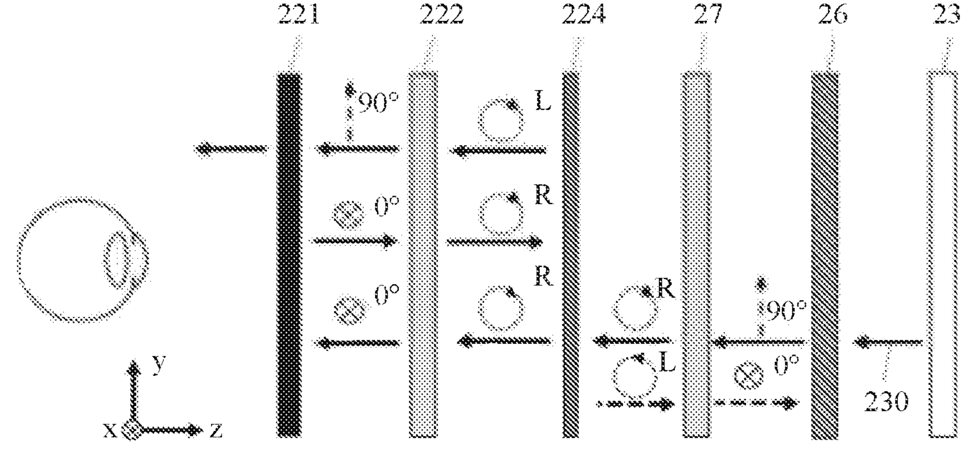
FIG. 7 is a schematic diagram of a propagation path of a second light ray of a structure shown in FIG. 3.
FIG. 8 is a schematic diagram of another propagation path of a second light ray of a structure shown in FIG. 3.

To clearly describe a process in which a user views a picture displayed on the display screen 23, refer to FIG. 7. FIG. 7 is a schematic diagram of a path of a second light ray of the structure shown in FIG. 3. FIG. 7 shows polarization states of a second light ray emitted by a display screen 23 after the second light ray passes through different elements during travelling to an eyeball of a user. As shown in FIG. 7, the second light ray from the display screen 23 is folded in a lens group 22, and emitted into the eyeball of the user finally.

Specifically, a second light ray 230 emitted by the display screen 23 first passes through a second linear polarizer 26 and is modulated to be linearly polarized light. Without loss of generality, a polarization direction maybe set to be along a y-axis direction. After passing through a third wave plate 27, the second light ray 230 becomes right-handed polarized light, and a fast axis direction of the third wave plate 27 is 45 degrees to the y-axis. Subsequently, the second light ray 230 reaches a partial-reflection partial-transmission film 224, a part of the second light ray 230 is reflected, and another part of the second light ray 230 is transmitted and passes through a first wave plate 222 to reach a reflective polarizer 221. A fast axis direction of the first wave plate 222 is the same as that of the third wave plate 27. In this case, the second light ray 230 is re-modulated to be linearly polarized light, and a polarization direction is along an x-axis direction. The reflective polarizer 221 may reflect polarized light in the x-axis direction, and transmit polarized light in the y-axis direction. Therefore, the second light ray 230 is reflected, and passes through the first wave plate 222 to reach the partial-reflection partial-transmission film 224. In this case, the second light ray 230 is right-handed polarized light. As described above, a part of the second light ray 230 is transmitted, and another part of the second light ray 230 is reflected. A polarization state of the second light ray 230 changes to left-handed polarized light, and after passing through the first wave plate 222, the second light ray 230 is modulated to be linearly polarized light again, and a polarization direction is along the y-axis direction. Based on features of the reflective polarizer 221, the second light ray 230 is emitted through the reflective polarizer 221, and finally enters the eyeball. It can be learned from the foregoing descriptions of a path of the second light ray 230 that, the second light ray 230 emitted by the display screen 23 is folded in the lens group 22 and finally enters the eyeball. The second light ray 230 emitted by the display screen 23 is folded through the lens group 22, which increases an optical path of the second light ray 230, but does not increase a thickness of an augmented reality component 20, and facilitates miniaturization of the augmented reality component 20.

In addition, when the second light ray 230 reaches the partial-reflection partial-transmission film 224, a part of the second light ray 230 is transmitted and finally enters the eyeball, another part of the second light ray 230 is reflected by the partial-reflection partial-transmission film 224 to form the left-handed polarized light, a part is reflected to the third wave plate 27, to form linearly polarized light, and a polarization direction is along the x-axis direction. Based on features of the second linear polarizer 26, the second light ray 230 is intercepted by the second linear polarizer 26 (an optical path part represented by a dashed arrow in FIG. 7).

In this application, the second linear polarizer 26 and the third wave plate 27 are disposed between the display screen 23 and the lens group 22. This can intercept a part that is of the second light ray 230 emitted from the display screen 23 and that returns to the display screen 23 after being reflected by the lens group 22, and reduce a ghosting phenomenon in the augmented reality component 20 due to a reflected light ray, and therefore, the user can view a clearer picture.

As shown in FIG. 8, a part that is of a second light ray 230 and that is formed by reflection by a partial-reflection partial-transmission film 224 is reflected to a second wave plate 2432, and is modulated by the second wave plate 2432 to be linearly polarized light whose polarization direction is along an x'-axis direction. A light transmission axis of a first linear polarizer 2431 is along the x'-axis direction. Therefore, the linearly polarized light passes through the first linear polarizer 2431 and enters a camera module 24. In this application, a controller 25 controls the camera module 24 to perform exposure when a display screen 23 is in a black insertion time period, and to stop exposure when the display screen 23 is in a display time period. Therefore, in an eye movement tracking and identity recognition process, the second light ray 230 of the display screen 23 is not sensed by the camera module 24. This effectively prevents stray light from the display screen 23 from entering the camera module 24, and improves precision of eye movement tracking or identity recognition.

Certainly, in another embodiment, the camera module may alternatively be disposed on a light-incident side of a lens group and disposed towards the lens group. In this case, a part of the second light ray is transmitted into the camera module through the lens group. Alternatively, the camera module may alternatively be embedded inside the display screen and disposed towards the lens group. In this case, when the display screen is in the display time period, a light ray emitted by the display screen does not enter the camera module, and an augmented reality device may not include a controller. To be specific, the controller may not control the camera module to perform exposure in the black insertion time period, and to stop exposure in the display time period. This can prevent the stray light from entering the camera module.

Figures 9, 10:
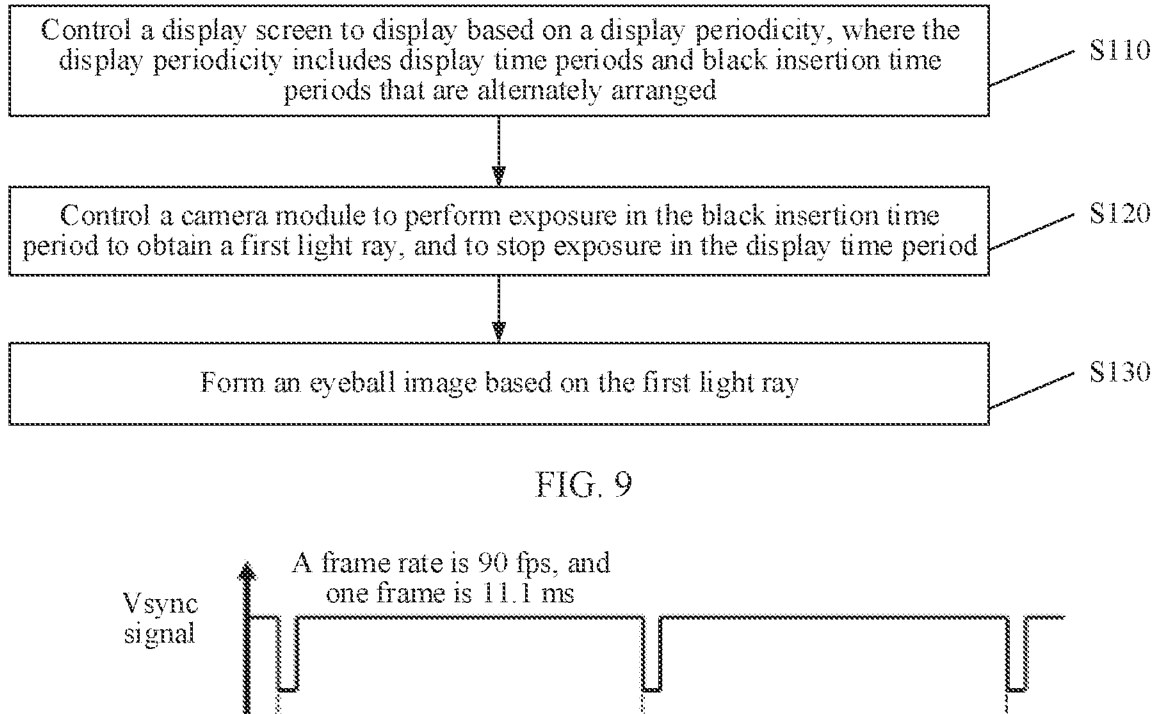
FIG. 9 is a schematic flowchart of a control method for an electronic device according to an embodiment of this application.
FIG. 10 is a schematic diagram of display of a display screen of an augmented reality component shown in FIG. 3.

FIG. 9 is a schematic flowchart of a control method for an electronic device 100 according to an embodiment of this application. The control method is applied to the electronic device 100 shown in FIG. 3. As shown in FIG. 9, the control method for the electronic device 100 includes the following S110 to S130.

S110: Controlling a display screen 23 to display based on a display periodicity, where the display periodicity includes display time periods and black insertion time periods that are alternately arranged.

Specifically, in the electronic device 100, to eliminate a smearing phenomenon of a picture when a head moves, black insertion processing is performed for the display screen 23, to be specific, the display screen 23 is in a turned-on state within time that is only about 20% of the display periodicity, and the time period is a display time period. The display screen 23 is in a turned-off state in other time, and the time period is a black insertion time period. As shown in FIG. 10, in this embodiment, a display screen with a frame rate of 90 fps is used as an example. An interval between two Vsync signals is a displayed frame interval, which is about 11.1 ms. The display screen 23 is in a turned-off state within 8.9 ms after the Vsync signal, and the display screen 23 is in a turned-on state within the last about 2.2 ms of the frame interval. Then, a next frame periodicity is entered. In other words, the display screen 23 is sequentially in a black insertion time period and a lighting time period in one frame, and then the next frame is also sequentially in a black insertion time period and a lighting time period, so that the periodicity is repeated.

S120: Controlling a camera module 24 to perform exposure in the black insertion time period, to obtain a first light ray, and to stop exposure in the display time period.

Specifically, before the camera module 24 is controlled to perform exposure, a light source is lit. Specifically, first, a controller 25 responds to a user recognition instruction or an eye movement tracking instruction. The user recognition instruction and the eye movement tracking instruction may be delivered to the controller 25 through a central processing unit of the electronic device 100. Certainly, the controller 25 may also obtain a state of the electronic device 100, and enable the user recognition instruction or the eye movement tracking instruction based on the state of the electronic device 100.

Figure 11:
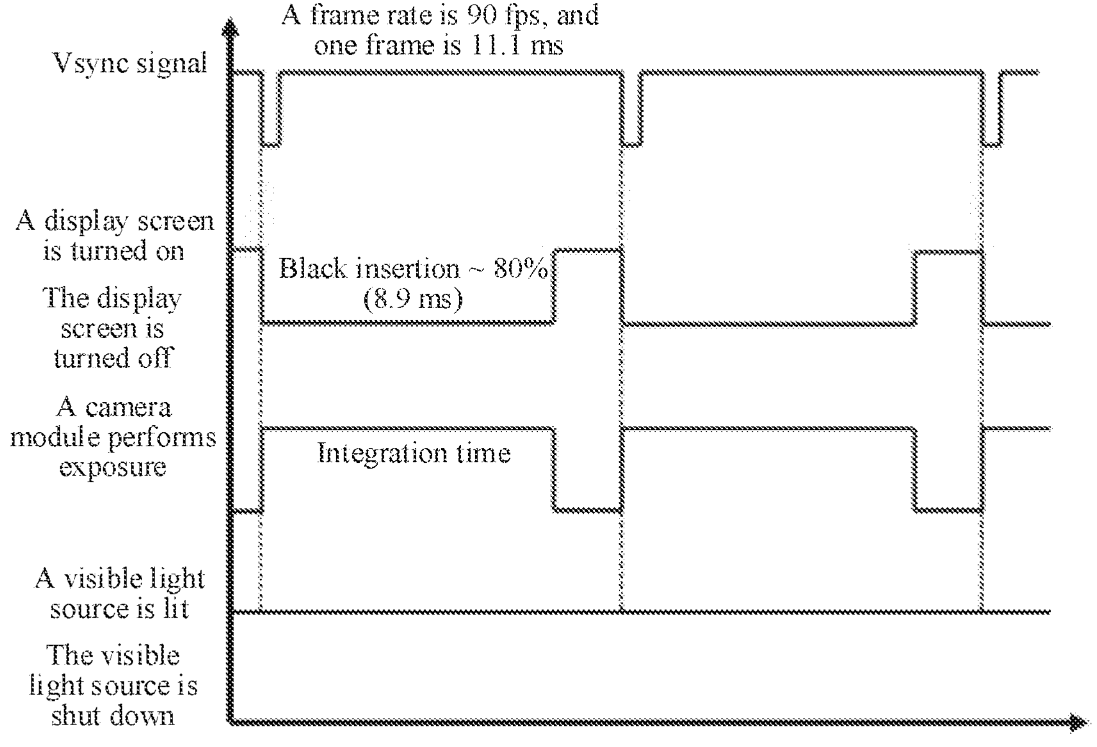
FIG. 11 is a schematic diagram of control of a control method shown in FIG. 9.

Refer to FIG. 11. When a controller 25 responds to a user recognition instruction, a visible light source 211 is controlled to emit a first light ray, and a camera module 24 performs exposure in a black insertion time period, and stops exposure in a display time period.

Figure 12:
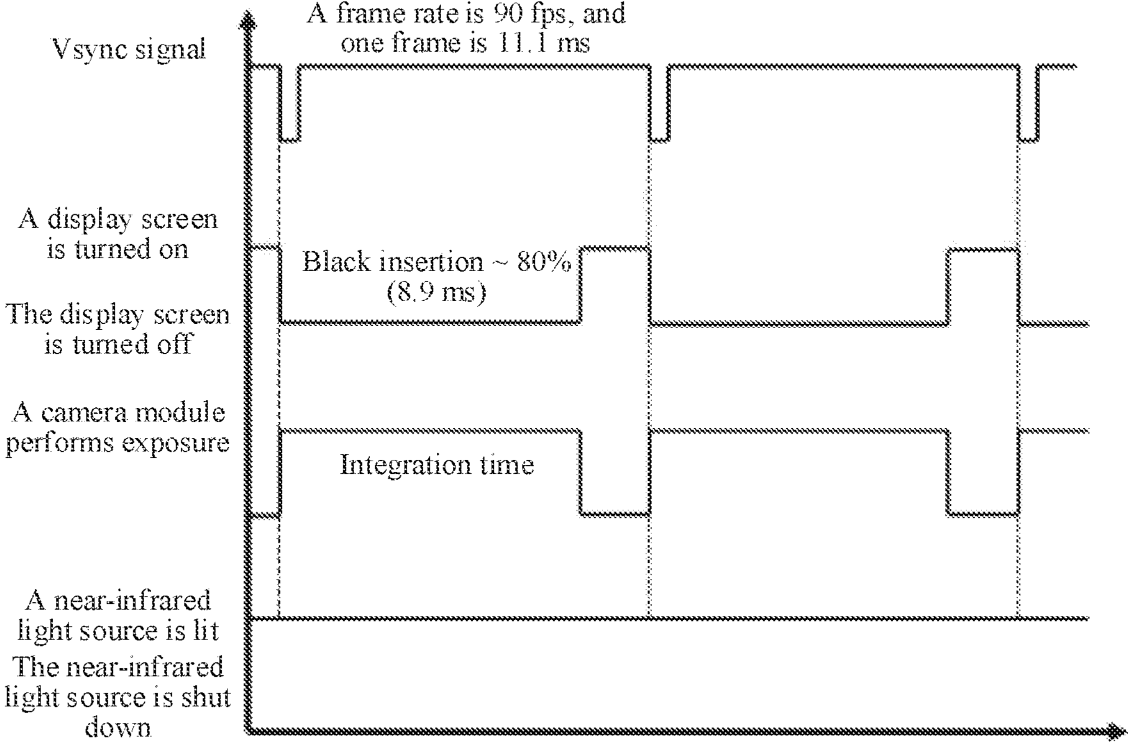
FIG. 12 is another schematic diagram of control of a control method shown in FIG. 9.

Refer to FIG. 12. When a controller 25 responds to an eye movement tracking instruction, a near-infrared light source 212 is controlled to emit a first light ray, a camera module 24 performs exposure in a black insertion time period, and stops exposure in a display time period.

For example, the light source is lit in the lighting time period. In the embodiments in FIG. 11 and FIG. 12, the visible light source 211 and the near-infrared light source 212 are lit in the lighting time period, and the lighting time period covers the display time period and the black insertion time period. In other words, the visible light source 211 is in a steady-on state in response to an identity recognition instruction, and the near-infrared light source 212 is in a steady-on state in response to the eye movement tracking instruction. In another embodiment, the lighting time period covers at least one display time period and at least one black insertion time period.

Figure 13:
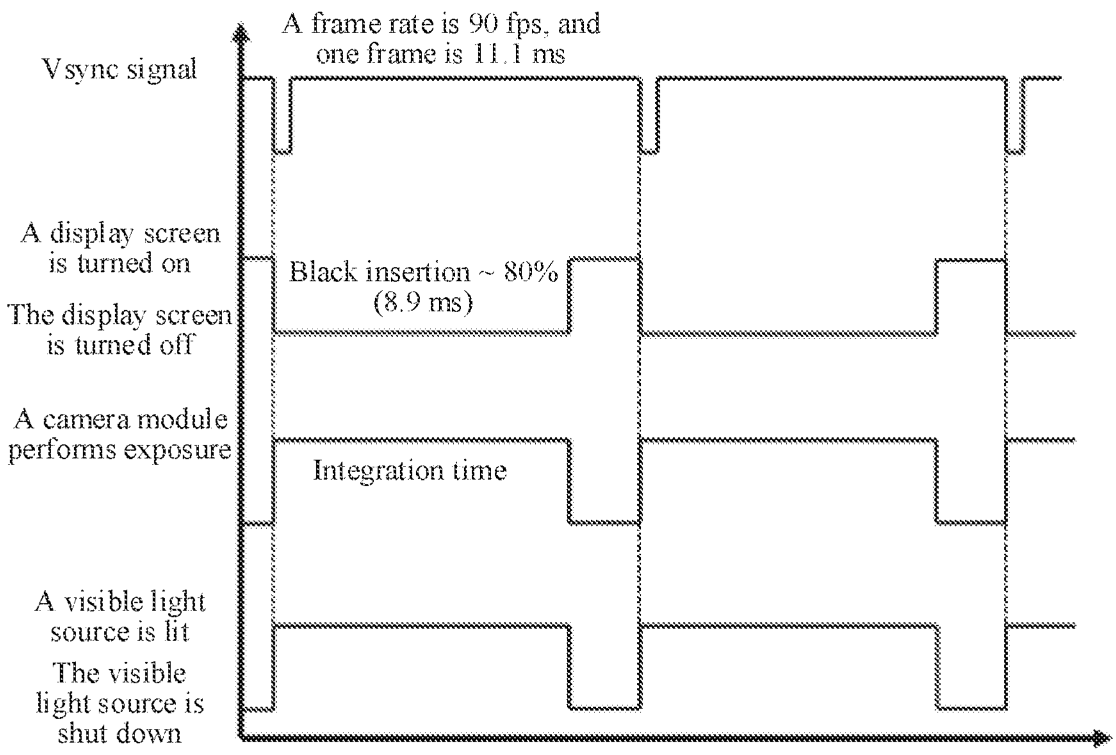
FIG. 13 is another schematic diagram of control of a control method shown in FIG. 9.

Certainly, in another embodiment, the light source is lit in the lighting time period, and the lighting time period covers at least one black insertion time period. It may be understood that the light source may alternatively be lit when the camera module 24 performs exposure, in other words, lighting of the light source and exposure by the camera module are performed simultaneously. For example, as shown in FIG. 13, when a controller 25 responds to a user recognition instruction, a visible light source 211 and a camera module 24 are controlled to be lit and to perform exposure respectively in a black insertion time period. The visible light source 211 and the camera module 24 are controlled to be shut down and to stop exposure respectively in a display time period. In other words, because the camera module 24 does not perform exposure when a display screen 23 is in the display time period, a photo of an eyeball of a user does not need to be photographed, and therefore, the visible light source 211 does not need to be lit. This effectively saves energy.

Figure 14:
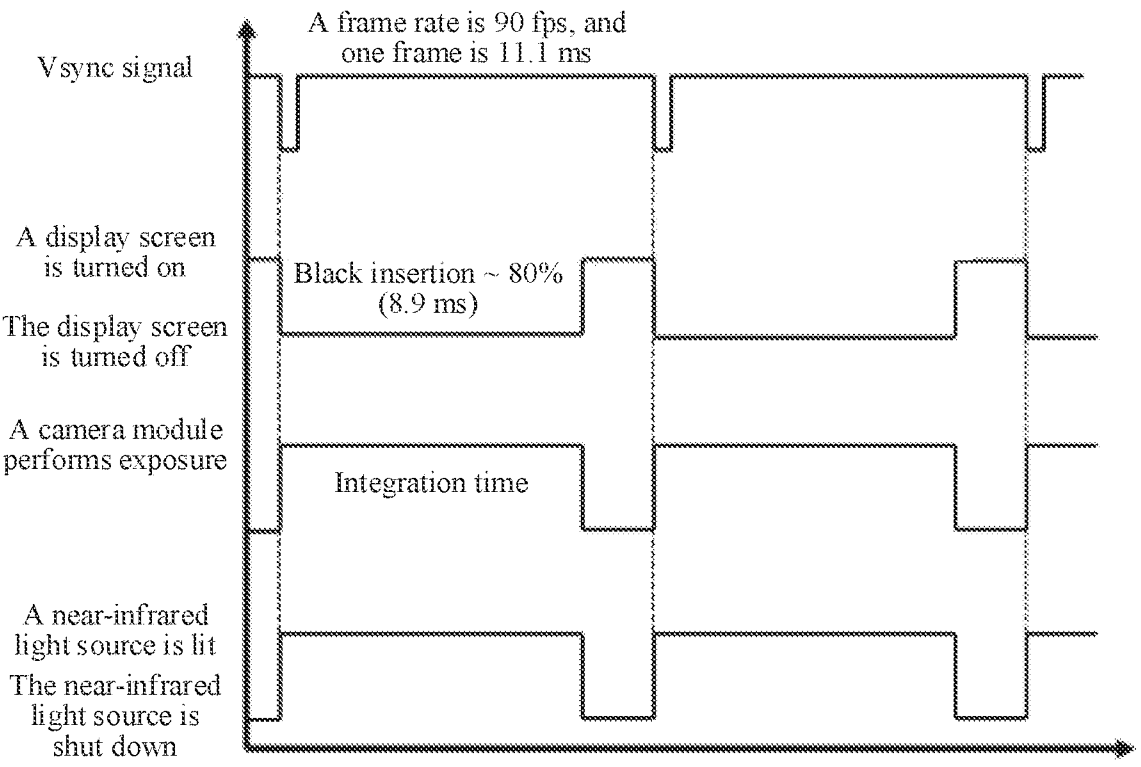
FIG. 14 is another schematic diagram of control of a control method shown in FIG. 9.

As shown in FIG. 14, when a controller 25 responds to an eye movement tracking instruction, a near-infrared light source 212 and a camera module 24 are controlled to be lit and to perform exposure respectively in a black insertion time period. The near-infrared light source 212 and the camera module 24 are controlled to be shut down and to stop exposure respectively in a display time period. In other words, because the camera module 24 does not perform exposure when a display screen 23 is in the display time period, a photo of an eyeball of a user does not need to be photographed, and therefore, the near-infrared light source 212 does not need to be lit. This effectively saves energy.

Certainly, the lighting time period may cover a plurality of adjacent black insertion time periods, or may cover a plurality of black insertion time periods at intervals. The lighting time period may alternatively cover the black insertion time period and a part of the display time period before the black insertion time period.

In this application, the camera module 24 is controlled to perform exposure when the display screen 23 is in the black insertion time period, and to stop exposure when the display screen 23 is in the display time period. Therefore, in an eye movement tracking and identity recognition process, the second light ray of the display screen 23 is not sensed by the camera module 24. This effectively prevents stray light from the display screen 23 from entering the camera module 24, and effectively improves precision of the eye movement tracking or the identity recognition.

S130: Forming an eyeball image based on the first light ray.

Specifically, when the controller 25 responds to an identity recognition instruction, the camera module 24 performs exposure to obtain a first eyeball image, and the first eyeball image is used for sclera recognition. When the controller 25 responds to an eye movement tracking instruction, the camera module 24 performs exposure to obtain a second eyeball image, and the second eyeball image is used for eye movement tracking.

It may be understood that the eyeball image (the first eyeball image or the second eyeball image) may be an image obtained by the camera module 24 through exposure in a black insertion time period in one frame, or may be an image obtained by the camera module 24 through exposure in black insertion time periods in a plurality of frames. The black insertion time periods in the plurality of frames may be a plurality of adjacent black insertion time periods, or may be a plurality of black insertion time periods at intervals. For example, the camera module 24 performs exposure in a black insertion time period in a first frame, then stops exposure in a display time period in the first frame, and then continues to perform exposure in a black insertion time period in a second frame, to obtain an eyeball image. In this case, the eyeball image is an image formed by the camera module 24 through accumulative exposure in two adjacent black insertion time periods. Similarly, the camera module 24 may alternatively perform exposure in the black insertion time period in the first frame, stop exposure in the display time period in the first frame, do not perform exposure in the second frame, and then perform exposure in a black insertion time period in a third frame, to obtain an eyeball image. In this case, the eyeball image is an image formed by the camera module 24 through accumulative exposure in two black insertion time periods at an interval.

Figure 15:
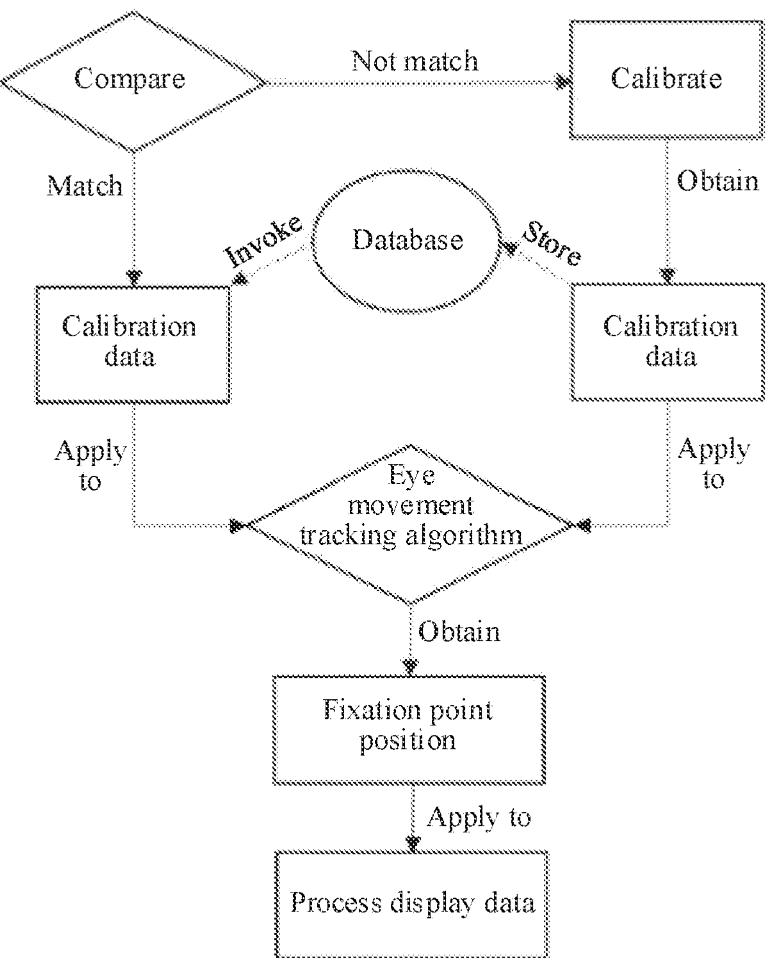
FIG. 15 is a schematic flowchart of a part of operations of a control method shown in FIG. 9.

As shown in FIG. 15, a control method further includes: comparing a first eyeball image with a pre-stored image; and if the two match, invoking pre-stored eye movement calibration data in a database, where the pre-stored eye movement calibration data corresponds to the pre-stored image. The eye movement calibration data is used for an eye movement tracking algorithm, and an eyeball fixation point position is output based on the eye movement tracking algorithm. The eyeball fixation point position is used for assisting in processing display data, that is, foveated rendering. If the first eyeball image does not match the pre-stored image, eye movement of a user is calibrated, to obtain eye movement calibration data. The eye movement calibration data is used for an eye movement tracking algorithm, and an eyeball fixation point position is output based on the eye movement tracking algorithm. The eyeball fixation point position is used for assisting in processing display data, that is, foveated rendering. In addition, the eye movement calibration data is stored in an eye movement calibration database for next use.

Certainly, in another embodiment, when the control method is applicable to an electronic device that is turned on and that displays a startup interface, the first eyeball image is compared with the pre-stored image, and if the two match, the electronic device is unlocked, to enable the electronic device to enter a home interface. If the first eyeball image does not match the pre-stored image, an unlocking password is displayed. In the control method, a speed of unlocking an electronic device is high, which improves user experience.

According to the control method provided in this application, identity recognition is performed on a user, sclera information of the user can be registered when the user uses an electronic device 100 for the first time, and an eye movement calibration parameter of the user is stored in a personal file. When the user uses the electronic device 100 again, a system directly invokes the eye movement calibration parameter of the user after confirming an identity of the user through sclera recognition, and the user may not need to perform eye movement calibration again. This saves time of the user and greatly improves user experience. Certainly, the identity recognition may be further used in a scenario in which the electronic device 100 is used, for example, sclera recognition payment is used for replacing password payment.

The foregoing descriptions are merely some embodiments and implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A control method for an electronic device, and comprising:

controlling a display screen of the electronic device to display based on a display periodicity, wherein the display periodicity comprises display time periods and black insertion time periods that are alternately arranged;

controlling a camera of the electronic device to perform exposure in one or more of the black insertion time periods to obtain a first light ray, wherein the camera is a near-infrared light and visible light dual-pass camera;

controlling the camera to stop exposure in one or more of the display time periods, wherein a light source of the electronic device comprises a visible light source and a near-infrared light source;

forming an eyeball image based on the first light ray;

controlling, in response to a user recognition instruction, the visible light source to emit the first light ray, wherein the camera performs exposure to obtain a first eyeball image, and wherein the first eyeball image is for sclera recognition; and controlling, in response to an eye movement tracking instruction, the near-infrared light source to emit the first light ray, wherein the camera performs exposure to obtain a second eyeball image, and wherein the second eyeball image is for eye movement tracking.

2. The control method of claim 1, wherein before controlling the camera to perform exposure, the control method further comprises lighting the light source of the electronic device.

3. The control method of claim 2, wherein lighting the light source comprises lighting the light source in a lighting time period, wherein the lighting time period covers the one or more of the display time periods and the one or more of the black insertion time periods.

4. The control method of claim 2, wherein lighting the light source comprises lighting the light source in a lighting time period, wherein the lighting time period covers the one or more of the black insertion time periods.

5. The control method of claim 1, wherein the control method further comprises:

comparing the first eyeball image with a pre-stored image; and invoking, when the first eyeball image matches the pre-stored image, pre-stored eye movement calibration data, wherein the pre-stored eye movement calibration data corresponds to the pre-stored image.

6. The control method of claim 5, wherein the control method further comprises calibrating, when the first eyeball image does not match the pre-stored image, eye movement of a user to obtain eye movement calibration data.

7. The control method of claim 6, wherein the control method further comprises storing the eye movement calibration data in an eye movement calibration database.

8. The control method of claim 1, wherein when the electronic device displays a startup interface, the control method further comprises:

comparing the first eyeball image with a pre-stored image; and unlocking, when the first eyeball image matches the pre-stored image, the electronic device to enter a home interface.

9. The control method of claim 1, wherein the display time periods are time periods when the display screen is in a turned-on state, and wherein the black insertion time periods are time periods when the display screen is in a turned-off state.

10. The control method of claim 1, wherein forming the eyeball image comprises forming the eyeball image based on accumulative exposure by the camera across the one or more of the black insertion time periods in each of a plurality of frames.

11. An electronic device comprising:

a lens group comprising a light-emitting side and a second side opposite the light-emitting side;

a camera comprising a light-incident side facing the lens group, wherein the camera is a near-infrared light and visible light dual-pass camera;

a display screen disposed on the light-emitting side of the lens group and configured to emit a second light ray, wherein a display periodicity of the display screen comprises display time periods and black insertion time periods that are alternately arranged;

a light source disposed on the second side of the lens group and comprising:

a visible light source; and a near-infrared light source, wherein the light source is configured to emit a first light ray to an eyeball of a user to cause the first light ray to be reflected by the eyeball and enter the camera through the lens group and to cause the second light ray to be partly reflected or transmitted into the camera through the lens group; and a controller electrically connected to the light source, the camera, and the display screen, wherein the controller is configured to:

control the camera to perform exposure in one or more of the black insertion time periods to obtain the first light ray;

stop exposure in one or more of the display time periods;

form an eyeball image based on the first light ray;

control, in response to a user recognition instruction, the visible light source to emit the first light ray, wherein the camera performs exposure to obtain a first eyeball image, and wherein the first eyeball image is for sclera recognition; and control, in response to an eye movement tracking instruction, the near-infrared light source to emit the first light ray, wherein the camera performs exposure to obtain a second eyeball image, and wherein the second eyeball image is for eye movement tracking.

12. The electronic device of claim 11, wherein the lens group comprises:

a lens comprising a lens light-emitting side; and a partial-reflection partial-transmission film disposed on the lens light-emitting side.

13. The electronic device of claim 12, wherein a transmittance of the partial-reflection partial-transmission film in a first band is greater than 95%, wherein a reflectivity is less than 1%, and wherein the first band is a frequency band in which near-infrared light is located.

14. The electronic device of claim 12, wherein the lens further comprises a lens light-incident side, wherein the lens group further comprises:

a first wave plate disposed on the lens light-incident side; and a reflective polarizer disposed on the first wave plate, wherein the camera further comprises:

a second wave plate; and a first linear polarizer located between the second wave plate and a camera lens of the camera, wherein a polarization direction of the reflective polarizer is the same as a polarization direction of the first linear polarizer, and wherein both the first wave plate and the second wave plate are quarter wave-plates.

15. The electronic device of claim 12, wherein the lens further comprises a lens light-incident side, wherein the lens group further comprises:

a first wave plate disposed on the lens light-incident side; and a reflective polarizer disposed on the first wave plate, wherein the camera further comprises a first circular polarizer, wherein rotation directions of the first circular polarizer and the first wave plate are the same, and wherein polarization directions of the first circular polarizer and the reflective polarizer are the same.

16. The electronic device of claim 12, wherein the lens further comprises a lens light-incident side, wherein the lens group further comprises:

a first wave plate disposed on the lens light-incident side; and a reflective polarizer disposed on the first wave plate, wherein the camera further comprises:

a second wave plate; and a first linear polarizer located between the second wave plate and a camera lens of the camera, wherein a polarization direction of the reflective polarizer is perpendicular to a polarization direction of the first linear polarizer, and wherein both the first wave plate and the second wave plate are quarter wave-plates.

17. The electronic device of claim 12, wherein the lens further comprises a lens light-incident side, wherein the lens group further comprises:

a first wave plate disposed on the lens light-incident side; and a reflective polarizer disposed on the first wave plate, wherein the camera further comprises a first circular polarizer, wherein rotation directions of the first circular polarizer and the first wave plate are the same, and wherein polarization directions of the first circular polarizer and the reflective polarizer are perpendicular to each other.

18. The electronic device of claim 11, wherein the display screen comprises a screen light-emitting side, wherein the electronic device further comprises:

a second linear polarizer disposed on the screen light-emitting side; and a third wave plate disposed between the second linear polarizer and the lens group.

19. The electronic device of claim 11, wherein the display time periods are time periods when the display screen is in a turned-on state, and wherein the black insertion time periods are time periods when the display screen is in a turned-off state.

20. An electronic device comprising:

a light source comprising:

a visible light source; and a near-infrared light source; and a controller configured to cause the electronic device to:

control a display screen of the electronic device to display based on a display periodicity, wherein the display periodicity comprises display time periods and black insertion time periods that are alternately arranged;

control a camera of the electronic device to perform exposure in one or more of the black insertion time periods to obtain a first light ray, wherein the camera is a near-infrared light and visible light dual-pass camera;

control the camera to stop exposure in one or more of the display time periods;

form an eyeball image based on the first light ray;

control, in response to a user recognition instruction, the visible light source to emit the first light ray, wherein the camera performs exposure to obtain a first eyeball image, and wherein the first eyeball image is for sclera recognition; and control, in response to an eye movement tracking instruction, the near-infrared light source to emit the first light ray, wherein the camera performs exposure to obtain a second eyeball image, and wherein the second eyeball image is for eye movement tracking.

* * * * *